United States Patent [19]
Reth et al.

[11] 3,737,021
[45] June 5, 1973

[54] DEVICE FOR TRANSFERRING GROUPS OF RODS FROM A RAKE-TYPE COOLING BED TO A SERIES OF ROLLERS FOR CHARGING A COOLING BED COLD SHEARS

[75] Inventors: Erich Reth, 41 Duisburg-Buchholz; Walter Uthmann, 41 Duisburg, both of Germany

[73] Assignee: DEMAG, Duisburg, Wolfgang-Reuter-Platz, Germany

[22] Filed: Apr. 5, 1971

[21] Appl. No.: 131,089

[30] Foreign Application Priority Data

Apr. 20, 1970 Germany..................P 20 18 849.2

[52] U.S. Cl..............................198/20 R, 198/22
[51] Int. Cl..............................................B65g 47/00
[58] Field of Search....................198/34, 27, 20, 21, 198/22, 22 R

[56] References Cited

UNITED STATES PATENTS

| | | | |
|---|---|---|---|
| 3,375,941 | 4/1968 | Repper | 198/27 |
| 3,093,234 | 6/1963 | Janssen | 198/34 |

FOREIGN PATENTS OR APPLICATIONS

| | | | |
|---|---|---|---|
| 1,334,415 | 7/1963 | France | 198/34 |

*Primary Examiner*—Richard E. Aegerter
*Attorney*—John J. McGlew and Alfred E. Page

[57] ABSTRACT

A device for transferring articles such as rods from a first location such as from a rake type cooling bed to a second location such as onto a series connected roller bed for feeding or charging a cooling bed cold-shears comprises at least one endless conveyor belt which is located between the first station and the second station. The endless conveyor belt if only one is employed includes an effective reach which is shiftable upwardly and downwardly in a vertical plane in order to shift the end thereof which is remote from the pickup or first station in respect to the delivery or second station.

Each conveyor belt includes a plurality of areas along the length which have receiving teeth between which the rods to be transferred are engaged and also an area which is smooth between each receiving tooth section. The apparatus may include a stationary endless conveyor arranged adjacent the receiving station and an additional conveyor extending from the first conveyor to the depositing station and which is shiftable in a vertical plane in order to provide an interception of the feed for lift off from the first conveyor and a delivery of the material to the second or receiving station.

1 Claim, 1 Drawing Figure

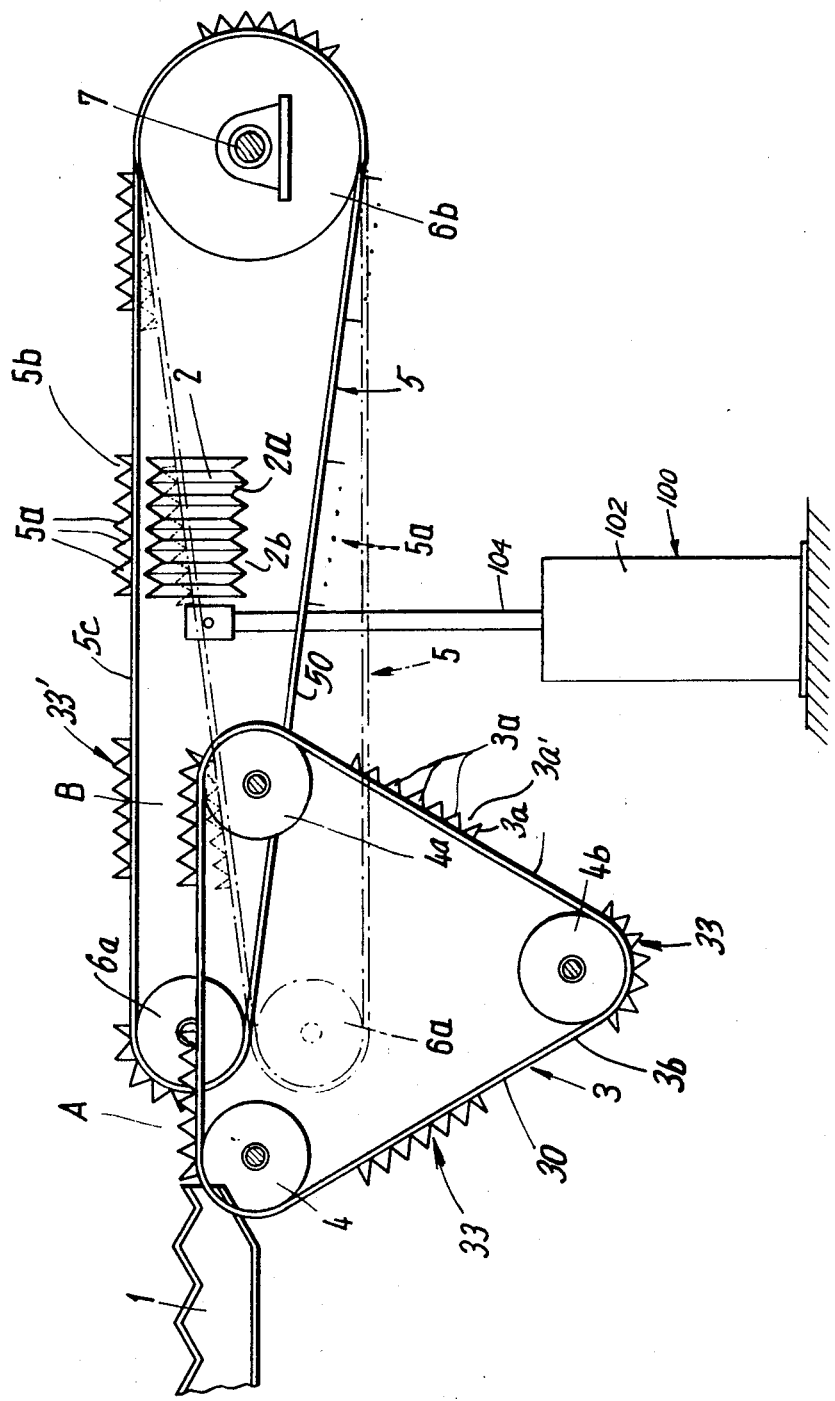

DEVICE FOR TRANSFERRING GROUPS OF RODS FROM A RAKE-TYPE COOLING BED TO A SERIES OF ROLLERS FOR CHARGING A COOLING BED COLD SHEARS

SUMMARY OF THE INVENTION

This invention relates in general to devices for feeding and storing elements such as rods to be treated and in particular to a new and useful device for transferring groups of rods from a rake-type cooling bed to a series connected delivery roller bed for charging a cooling bed-cold shears.

The invention is particularly applicable for use in a metallurgical plant for controlling the feed of metal rods between a cooling bed and a roller bed provided for removing the groups of rods from the cooling bed and for depositing them on the roller bed which feeds to a bed-cold shears. It is known to use, as a transfer unit, a transfer rake which overlaps the cooling bed with its moving rakes by several rake teeth or rack teeth. Such an arrangement includes a moving rake which extends to the opposite side of the roller bed and has a rake division which is the same as the division of the cooling bed and it is provided with a separate independently controllable drive. In this known device the transfer unit works in a normal operation in synchronism with the cooling bed rake. This has the result that the rods arrive in the provided divisions on the delivery roller bed. These divisions correspond to the profile division of the blade of the cool bed shears. By means of the independently controllable drive the transfer rake can be switched to a high speed when the delivery roller bed is already loaded with some of the rods and only a few rods have to be transported. The transfer rake is arranged to make as many revolutions within a very short time as the teeth of the moving rakes of the cooling bed so that the divisions overlap. Since the cooling bed rake maintains its speed of revolution empty teeth are formed in the range of the overlap rake teeth. As soon as the delivery roller bed is fully loaded with rods and these rods are evacuated the transfer rake is stopped. This has the effect that the cooling bed can work continuously independently of whether the transfer of the rods or groups of rods to the roller bed is effected continuously or intermittently.

The disadvantage of the known device however is that there is no possibility for storing the rods arriving from the rake-type cooling bed during times of difficulty or trouble for example on the cold shears. Beyond this it is not possible to collect flat materials in packs on the transfer unit and to thereafter transfer them correspondingly faster to the roller bed.

In accordance with the present invention there is provided a transfer unit which comprises at least one arrangement of endless chains or belts in the form of a conveyor having a reach which cooperates with both the cooling bed and the roller bed during its movement in the manner of a comb; and which includes at least a section which may be shifted between an upper position in which the upper reach is located above the top of the roller bed and a lower position in which the upper reach is located below the topside of the roller bed. Each of the endless chains or conveyor belts have alternate sections of rake teeth and smooth portions of equal length arranged side by side along the length of the conveyor belts and of a size corresponding to the working width of the roller bed. The arrangement permits the transfer of a group of rods between the teeth of the conveyor and the positioning of the rod in corresponding recesses between a set of rollers which operate to deliver the rods to further treatment means such as a shear.

In the preferred arrangement a first stationarily arranged conveyor belt is provided with sets of teeth at spaced intervals on its length which regularly engage with sets of rods which are delivered from the cooling bed and which move them outwardly away from the bed. Arranged alongside this first conveyor is a second conveyor which also is shiftable in a vertical plane so that its top reach may be arranged either below or above the top reach of the first conveyor and it may also be arranged either above or below the holding plane of the rolls for feeding the rods off to the shears. The two conveyors are operated in synchrony so that sets of the rods are transferred from one to the other and thereafter they may be positioned so that they can be transferred onto the rollers and in order to effect the transfer the conveyor belt is shifted in a vertical plane for example preferably about a pivot defined by one of the guide rollers for the conveyor.

The device of the invention has the advantage that relatively longer intermediate periods are available for removing the rods from the roller bed because the intermediate transportation by means of a transfer unit comprising the conveyor belt or chain can be effected at a higher speed with a transfer rake brought to a very high speed of revolution. In addition, the individual transfer units in the forms of conveyor belts or chains may be employed as storage units for a certain number of rods that have already been taken over by the cooling bed when there is difficulty in operation for example when there is a delay in the operation of the roll feeding unit. The conveyors are made of a sufficient length and are provided with a sufficient number of sections for handling groups of rods to insure that such storage can be sufficient. By the use of two transfer conveyor arrangements with one of them being movable for the transfer from one of the belts to the roller delivery system, a much wider adaptability to the various operating conditions may be effected.

Accordingly it is an object of the invention to provide an improved device for effecting the transfer of objects, particularly groups of rods, from a rake type cooling bed to a series connected rolling bed for charging a cooling bed cold shears which includes at least one conveyor having spaced groups of tooth like elements having recesses therebetween for accommodating individual rods of the group, and wherein the conveyor is movable to advance the individual tooth groups with the rods from a pickup location to a deposit location on the rolled units supplying the shears.

A further object of the invention is to provide a device for transferring objects, such as rods, which includes a first conveyor having a plurality of spaced sets of evenly spaced receiving recesses thereon which are engagable with individual rod elements located between the spaces, and a second conveyor which is mounted so that at least the upper reach thereof is movable in a vertical plane; and wherein the second conveyor is located between the first conveyor and a roller delivery system having a plurality of feed rollers, and it may be mould in a vertical plane for first picking the rods from the first conveyor and then transferring a group of the rods directly into the recess between the feed rollers.

A further object of the invention is to provide a transfer system for groups of rods which is simple in design, rugged in construction and economical to manufacture.

The various features of novelty which characterize the invention are pointed out with particularity in the claims annexed to an forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a schematic vertical sectional view of a transfer system constructed in accordance with the invention.

GENERAL DESCRIPTION OF THE PREFERRED EMBODIMENT

Referring to the drawings in particular, the invention embodied therein comprises a device for transferring articles, such as rods, from a roller bed side of a rake-type cooling bed 1 to a roller bed 2 which is schematically indicated but which includes a plurality of feed rollers 2 a, arranged to rotate about an axis substantially parallel to the plane of the drawings and which are arranged to feed the rods into association with bed-cold shears (not shown). The group of rollers 2a are arranged in abutting relationship and they define rod receiving spaces 2b therebetween for receiving individual rods which are to be delivered to shears (not shown).

In accordance with the invention, the rods are transferred from the cooling bed 1 to the roller bed 2 by means of conveyor means which includes; in the embodiment shown, first and second conveyors arranged in overlapping fashion for feeding from the cooling bed 1 to the first conveyor, and then a transfer to the second conveyor which moves then into a position for deposit onto the roll bed 2.

The first conveyor generally designated 3, comprises an endless belt or chain 30 which is guided over a triangular track over guide rollers 4, 4a and 4b. The roller 4b, for example, is a driving roller and it moves the endless belt or chain 30 to advance evenly spaced sets of rod receiving elements 33 through a path first intercepting the rake-type cooling bed 1 and then moving outwardly beyond this bed in a direction toward the roller bed 2. Each rod receiving means 33 includes a plurality of spaced teeth 3a, which define recesses therebetween 3a' for accommodating individual rods (not shown) which are to be transferred. The spaces between each set of rod receiving means 33 on the belt 30 are made smooth as indicated at 3b.

The embodiment shown in the only FIGURE of the drawing includes a second conveyor generally designated 5, which includes guide pulleys 6a and 6b, over which is movable an endless belt or chain 50. The belt or chain 50 includes evenly spaced sets of rod receiving elements 33' similar in construction to the elements 33 for the belt 3. Each of the receiving elements 33' include teeth 5a having spaces 5b therebetween for receiving the individual rods. In accordance with a feature of the construction the conveyor unit 5 may be shifted in a vertical plane for example by pivoting the outer pulley 6a, about the axis 7 to shift it from the solid line to the dotted line position shown in the drawing. Both the section 33 of the belt 3 and the section 33' of the belt 5 are arranged at fixed spaced locations on the associated belt, with the smooth sections 3b, 5c being of equal length and of the same length as the rod receiving sections. In the lowermost position the end facing the cooling bed 1 of the conveyor 5 is located beneath the upper reach of the conveyor 3. In the top position or solid line position, shown in the drawing, the conveyor 5 extends over the top of the roller bed 2.

The roller bed 2 comprises both plain and profiled rollers and it can be moved by raising and lowering it into and out of operating position depending upon the type of material to be fed to the cold shears.

The method of operating the device to the invention is as follows:

When the profiled material is to be taken out of the cooling bed 1, the conveyor unit 3 is started and so regulated that the first rod leaving the cooling bed arrives between the first two teeth 3a of the rod receiving section 33. The speed of the unit 3 is adjusted to the speed with which the rods leave the cooling bed 1, so that the second transferred rod arrives between the second and third tooth 3a, 3a. As soon as the intervals between all of the teeth 3a are filled the conveyor 3 is accelerated until the head of the following section arrives at the discharge end of the cooling bed 1. Then the speed is reduced and the respective section 33 is loaded. The smooth section 3b between the rod receiving sections 33 are not ordinarlly used in a transfer of the profiled material.

When the loaded section 33 is advanced from the position A to the position B transfer unit or conveyor 5 is in the lowered position in which the upper reach moves below the upper reach of the conveyor 3. The drive of the conveyor 5 is so adjusted that the speed of the section 33' is identical with the speed of the section 33 of the conveyor 3. Care is taken that the sections 33 and as as well as the smooth sections 3b and 5c overlap or are superposed or juxtaposed. If the conveyor 5 is therefore turned upwardly by rotating it about the axle 7, the section 33' takes over the material which is arranged on the section 33 and transports it to the roller bed 2. When the sections are at a location overlying the roller bed, the conveyor 5 is again lowered and the material becomes deposited within the spaces 2b between the rollers 2a. There is time to feed the material to the cold shears before the next group of rods are delivered by the next section 33'.

The conveyor 5 is either raised to the solid line position or lowered to the dotted line position shown by lift means generally designated 100 which includes a fluid pressure operated cylinder 102 which may be operated manually by an operator to move a piston having a rod 104 which is connected to the conveyor 5.

The above described arrangement has thus the effect that the material is maintained in individual groups which can be delivered and deposited all at once on the feeding rollers. If flat material, for example, is to be fed to the roller bed either bundled or loosely arranged, the speed of the units 3 and 5 are adjusted so that the rods coming from the cooling bed 1 arrive on the smooth section 3b of the conveyor 5. As soon as the section 3b is loaded the conveyor 3 is accelerated so that the rod receiving sections 33 remain free.

In a similar manner the material arranged closely side by side on a smooth section 3b is taken over by the section 5c when the unit 5 is raised and it is fed to the roller bed in this manner. The deposit on the roller bed 2 is effected by lowering the profile rolls and raising the smooth rolls and by again pivoting the unit 5 in a vertical plane to cause it to move downwardly below the surface of the rollers 2.

The conveyors 3 and 5 may be made longer to obtain an increased storage facility for the materials which are to be transferred. This permits the stopping of the conveyors whenever difficulty is encountered, for example, whenever the shears must be stopped. In some instances it is possible to let one of the sections 33 or 33' move beyond its discharge location and if necessary move it backwardly when the final delivery is to be made.

A simple arrangement for the application of the invention comprises using one conveyor 5 which is long enough to permit the sections 33' to engage in the cooling bed 1 and which also may be raised or lowered in vertical plane. In this case it is advisable however to arrange the reversing point of the operation on the side of the cooling bed 1.

It should also be appreciated that it is also possible to work with only the conveyor 3 if the latter is extended so that its upper reach extends beyond the roller bed 2 and is designed that it can turn in a vertical direction about the axle of the guide roller 4 which is closest to the cooling bed 1.

While a specific embodiment of the invention has been shown and described in detail to illustrate the application of the principles of the invention, it will be understood that the invention may be embodied otherwise without departing from such principles.

What is claimed is:

1. A device for transferring articles such as metal rods and flat plates from a first location such as rake-type cooling bed to a second location such as a roller bed for charging a cooling bed-cold shears, comprising a cooling bed station, a roller bed located at a spaced location from said cooling bed station and at least one conveyor having at least two spaced apart guide rollers with an endless conveyor member trained therearound having an upper reach trained to run from the vicinity of said cooling bed station to and beyond said roller bed station, the axis of at least one of said guide rollers being vertically displaceable to raise and lower at least one end of the upper reach, said endless conveyor member having a plurality of rod receiving sections arranged at equally spaced locations along the length with a plurality of rod-sized receiving recesses thereon for accommodating a plurality of rods in fixed orientation and also having flat unobstructed portions between said recesses for receiving flat plates, said upper reach being movable with the article receiving sections to advance the recesses under the articles in succession to move them out of said cooling bed and to move them to said roll station and alternatively to stop and hold them above said roll station for temporary storage, said upper reach being lowerable after the articles reach said roller bed station to lower the articles onto the roller bed, said upper reach being located at a spaced location from said cooling bed station and including a second conveyor located between said cooling bed station and the end of said conveyor and having a second conveyor endless member with a plurality of spaced article receiving sections thereon with bar-size receiving recesses and flat unobstructed portions comparable in spacing and number to those of said first conveyor and being movable to pick up articles at said cooling bed station and to transfer them to said first conveyor.

* * * * *